Aug. 12, 1947.   G. F. LANDGRAF   2,425,543
APPARATUS FOR CARVING PROPELLER BLADES
Filed Dec. 28, 1944   5 Sheets-Sheet 4

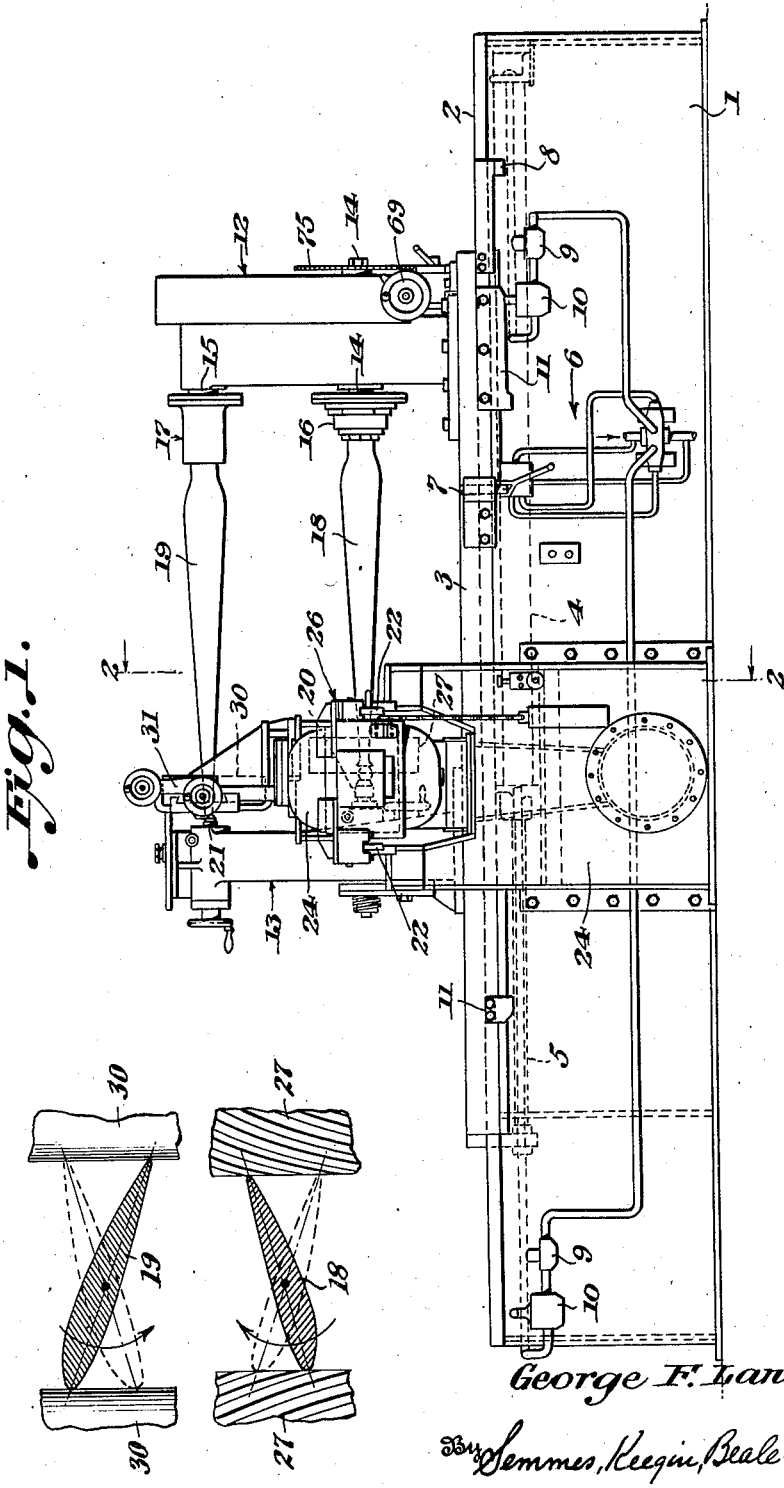

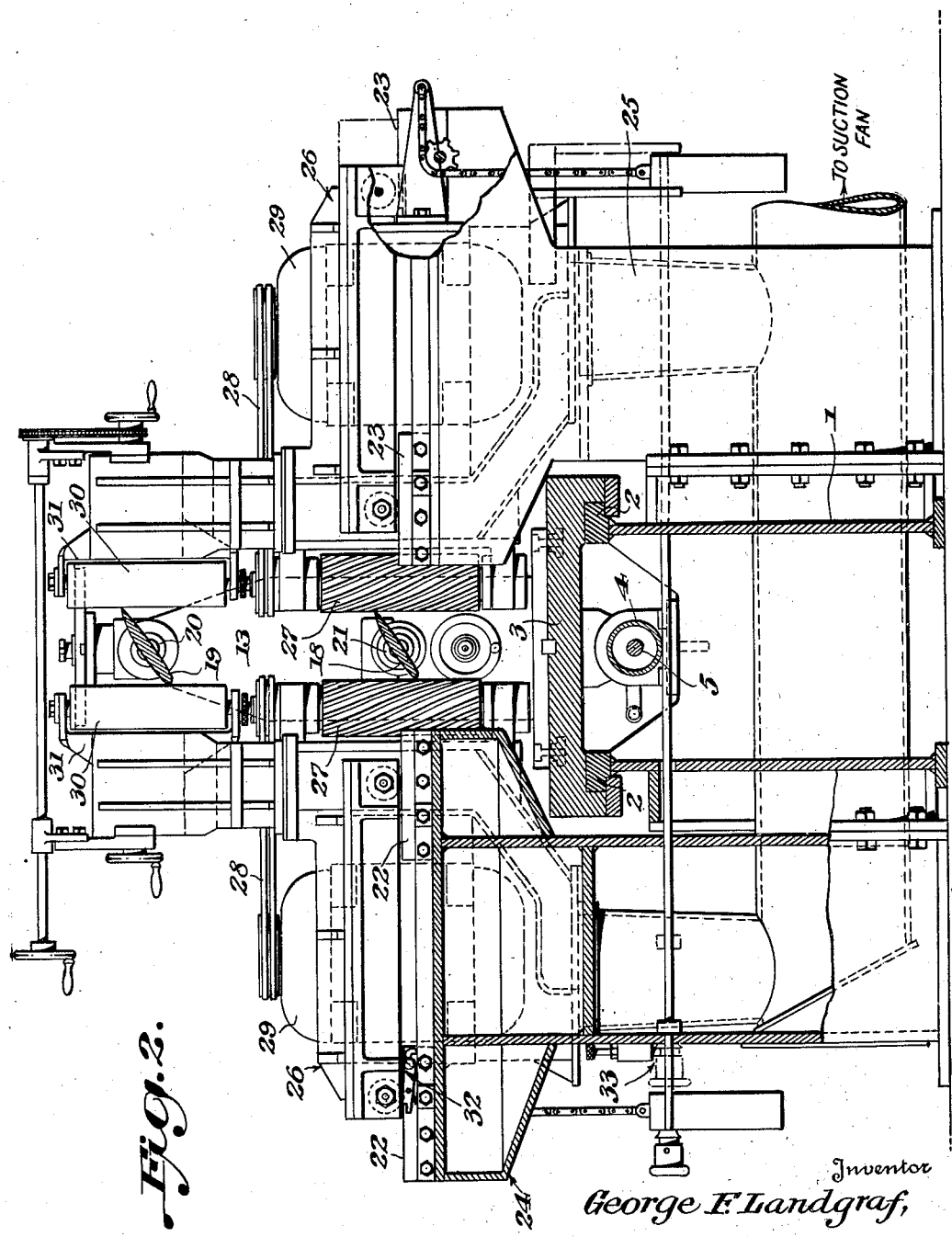

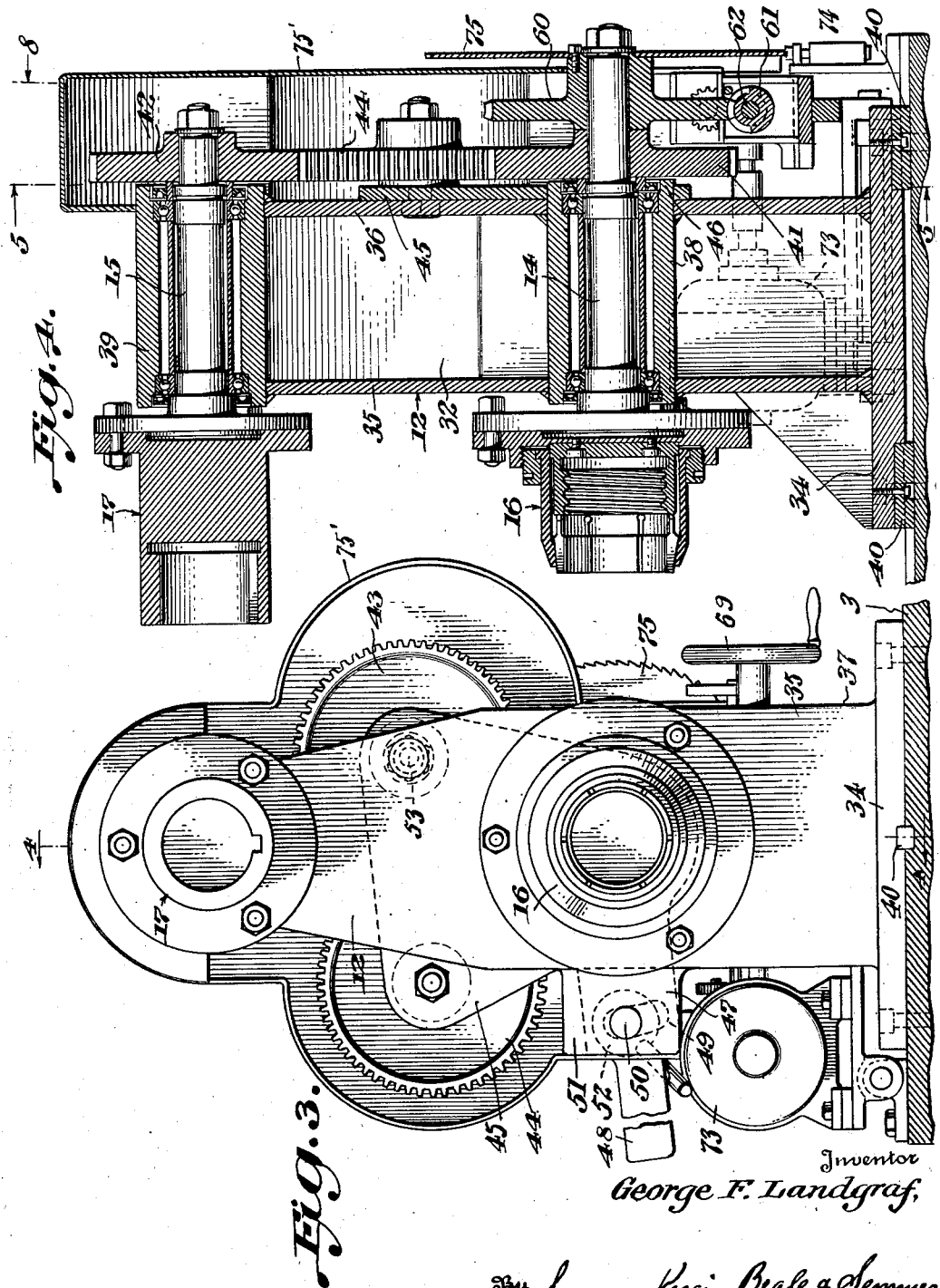

Inventor
George F. Landgraf,

By Semmes, Keelin, Beale & Semmes
Attorneys

Aug. 12, 1947.  G. F. LANDGRAF  2,425,543
APPARATUS FOR CARVING PROPELLER BLADES
Filed Dec. 28, 1944  5 Sheets-Sheet 5

Inventor
George F. Landgraf,
By Semmes, Keegin, Beale & Semmes
Attorneys

Patented Aug. 12, 1947

2,425,543

UNITED STATES PATENT OFFICE 2,425,543

APPARATUS FOR CARVING PROPELLER BLADES

George F. Landgraf, Cockeysville, Md., assignor to Koppers Company, Inc., doing business as Bartlett Hayward Division, Baltimore, Md., a corporation of Delaware Application December 28, 1944, Serial No. 570,126

6 Claims. (Cl. 90—13.4)

1

The present invention relates to machine tools and more especially to a machine tool for carving exactly corresponding blades for use in contra-rotating propellers. More particularly the invention embraces the concept of machining either right or left hand propeller blades in accordance with the contour of a single master model of one of the blades.

Tools have been devised for duplicating parts in which the work and a template are moved simultaneously with respect to a cutter, the template guiding the cutter to accordingly shape the work piece. This principle is employed in a machine tool for shaping propeller blades disclosed in a co-pending application of Claude M. Skinner, Serial No. 550,795, filed August 23, 1944, wherein the template is a model of the blade to be formed. This master model and a blade blank are set up in the machine in axially parallel relationship and moved longitudinally along the machine ways in reciprocating feed strokes. Between the feed strokes the model and blank are simultaneously indexed about their respective axes. During the reciprocating feed strokes the blank is carved by a rotary cutter whose feed is controlled by the engagement of a follower roll with the master model. Between work feed strokes the blank and model are simultaneously indexed about their respective axes in the same direction with the result that corresponding increments of the model and blank are respectively engaged by the follower roll and cutter and at the end of the carving operation the blank has been reduced to the exact shape of the model.

It will be apparent that this machine produces corresponding blades, that is, a right hand blade is shaped from a right hand model, and to shape left hand blades a left hand model must be used. It is highly important in contra-rotating propellers and particularly in automatic constant speed types, that not only must the blades in one propeller be all exactly similar but that those in the oppositely rotating propeller also exactly correspond to the others in weight, size, contour and aerodynamic characteristics. The difficulty and precision necessary to make two exactly corresponding master models, one right hand and the other left hand, will readily be seen.

It is therefore one of the objects of this invention to improve a propeller shaping machine of the above character by the provision of a reversible indexing mechanism whereby either right or left hand blades may be formed in accordance with a single master model of one blade.

Another object of the invention is to provide

2 means for synchronizing axial rotation of the work and master model in a propeller carving machine including a change gear system of idlers connecting the respective spindles supporting the work piece and model whereby they may be either indexed in the same direction to carve a blade similar to the model, or indexed in counter directions to carve a blade opposed to the model.

In order to make the invention more clearly understood, it has been made the subject of illustration in the accompanying drawings in connection with a blade carving machine of the type disclosed in the above-mentioned application Serial No. 550,795.

In the drawings:

Figure 1 is a side elevational view of the blade carving machine.

Figure 2 is a transverse sectional view taken along the line 2—2 of Figure 1.

Figure 3 is a face view of the headstock of the machine shown in Figure 1 incorporating the change gear feature in accordance with this invention.

Figure 4 is a transverse sectional view taken along the line 4—4 of Figure 3.

Figure 10 is a diagrammatic view illustrating the method of carving a blade of opposite pitch than that of the model in accordance with this invention.

Figure 5:
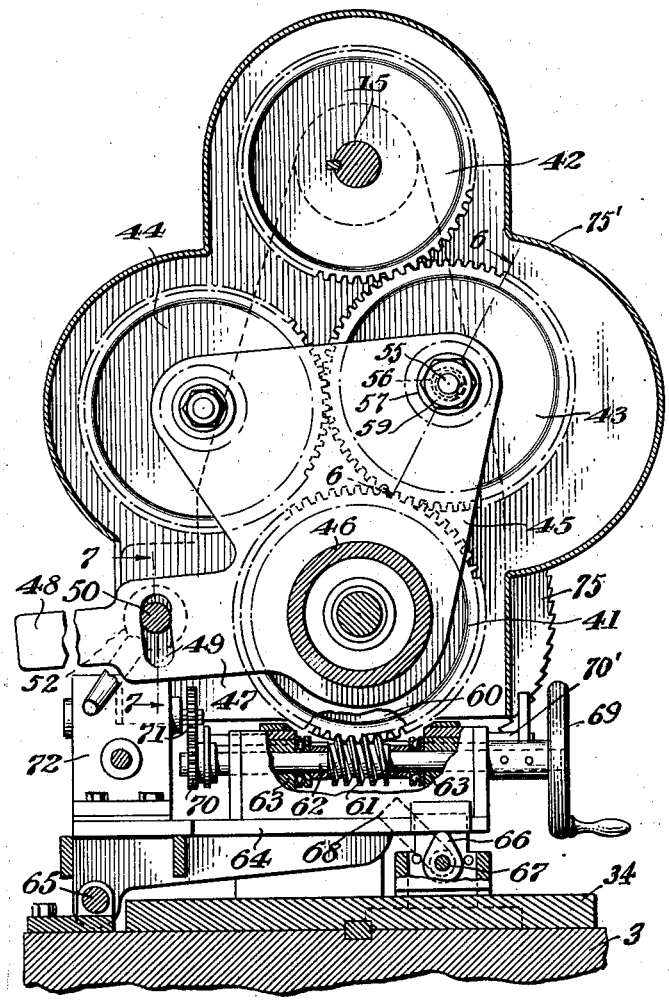
Figure 5 is a transverse sectional view taken along the line 5—5 of Figure 4.

The propeller carving machine above referred to consists essentially of an elongated bed 1 supporting parallel ways 2 on which is slidably mounted for reciprocating movement a work support table 3. This table is reciprocated by a hydraulic feed system including a cylinder 4 attached to the bed 1 and carrying a piston which has an operative connection through its rod 5 with the table. Hydraulic fluid under pressure is applied alternately to opposite faces of the piston. The fluid is controlled by a valve system indicated generally as 6 which is actuated by means of reversing dogs 7 and 8 carried by the table 3. Smooth movement of the table is accomplished by feeding against a back pressure by metering out the exhaust fluid through valves 9 and slowing down the feed at the end of each stroke by the action of valves 10 which are partially closed near the end of the strokes by cams 11 carried by the table.

The table 3 has mounted adjacent opposite ends thereof a headstock 12 and a tailstock 13. In the headstock 12 there are journaled a pair of superposed spindles 14 and 15, parallel with the ways 2 and each carrying a chuck, or other suitable holding device, designated generally as 16 and 17 and adapted to hold respectively the shank ends of a blade blank 18 and a model 19 of the blade to be carved. The tailstock 13 carries spindles 20 and 21, axially aligned with the headstock spindles and each carrying a center for supporting the respective tip ends of the blank and model. The headstock also carries the mechanism to be described in more detail later for the synchronized rotation of the spindles 14 and 15 to index the work and model.

Extending transversely from the ways, intermediate the length thereof, on opposite sides of the bed 1 are aligned parallel tracks 22 and 23 respectively mounted on supports 24 and 25 secured to the bed 1. Each of the tracks 22 and 23 support for rolling movement thereon a cutter carriage 26 carrying a rotary cutter 27 driven through a belt drive 28 by a high speed electric motor 29 also carried by the cutter carriage. Above each cutter 27 is a follower roll 30 freely rotatable about an axis parallel with that of the cutter. These rolls are adapted to engage and follow the contour of the model 19 to guide the cutter feed during feed strokes of the table 2 as the carriages 26 are moved inwardly of the machine by suitable means such as the weight arrangements shown in Figure 2. The rolls 30 are mounted on cross slides 31 for lateral adjustment with respect to the cutters for controlling the depth of cut made thereby.

For the major carving operations, both cutters are employed, removing material from opposite faces and edges of the blank. During certain operations, however, particularly in finishing the flat face of the blade, provision is made to retract one cutter to an inoperative position. To this end latch mechanisms, such as are shown at 32 and 33, are provided to latch the cutter carriages in a retracted position away from the work.

The headstock mechanism of which this invention constitutes an improvement is illustrated in detail in Figures 3 to 7. The headstock 12 comprises a base plate 34 to which is secured an upstanding frame consisting of a front plate 35, a rear plate 36 and side plates 37, all rigidly secured together. Passing transversely through the front and rear plates 35 and 36 and secured thereto are a pair of superposed sleeves 38 and 39 in which are journalled in ball bearings respectively for the lower spindle 14 and the upper spindle 15. The headstock is bolted to the upper surface of the table 3 and is accurately aligned thereon by means of keys 40, with the spindles parallel with the ways.

In accordance with one embodiment of this invention, the following mechanism is provided for rotating the spindles 14 and 15 to thereby index the blade blank and model about their axes. The spindles 14 and 15 both extend rearwardly from their respective sleeves and are respectively fitted with spur gears 41 and 42. Adapted to be selectively interposed between the gears 41 and 42, to effect either like or reversed rotation thereof are a pair of intermeshed idler gears 43 and 44, carried on an arm 45 which is pivotally mounted on a slight extension 46 of the lower sleeve 38 to pivot about the axis of the lower spindle 14. As seen in Figure 5, the gear 43 is constantly meshed with the lower gear 41 while the idler gear 44 is constantly meshed with the idler gear 43.

The arm 45 abuts the rear face of the back plate 36 of the headstock and is provided with a lateral extension 47 elongated to form a hand lever 48 by means of which the arm may be moved to engage either of the idlers 43 or 44 with the upper gear 42. In order to lock the idler supporting arm 45 in either of its selected positions, the extension 47 is provided with an arcuate slot 49 through which projects a threaded stud 50 secured to an ear 51 formed on the back plate 36. Threaded on the stud 50 to engage the extension 47 and clamp the idler arm into close frictional engagement with the back plate 36 is a nut 52.

Figure 6:
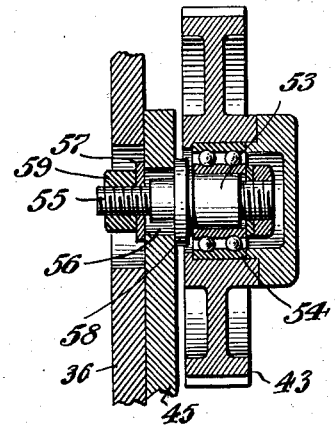
Figure 6 is a detail sectional view taken along the line 6—6 of Figure 5 showing the adjustable means for mounting one of the idler gears to its supporting structure to eliminate back lash in the train.
Figure 7:
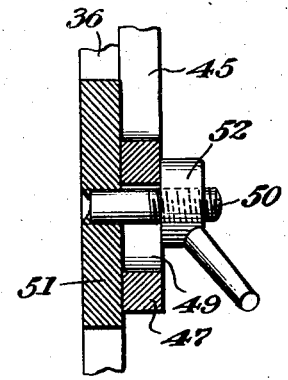
Figure 7 is a fragmental sectional view taken on the line 7—7 of Figure 5.

Preferably the gears should mesh and rotate without back lash and to this end the gear 43 is mounted for adjustment toward the gears 41 and 44 with which it is in constant mesh. One means for adjustably mounting the gear is shown in Figure 6 and consists of a stud or post 53 upon which the gear is mounted for free rotation by means of a ball bearing 54. The post is provided with a threaded extension 55 which extends through a hole 56 in the arm 45 and is held in place between a washer 57 and a peripheral flange 58 on the post, by means of a nut 59 drawn up on the threaded extension. The mounting hole 56 is of somewhat larger diameter than the extension 55 and permits a limited amount of movement of the post relative to the gears 41 and 44. By virtue of this movement the gear 43 may be moved into close engagement with both the gears 41 and 44 when it may then be locked into position by the nut 59.

With the gears in the position shown in Figure 5, that is, with the gear 43 serving as a single idler between the gears 41 and 42, rotation of the lower spindle 14 will produce a rotation of the upper spindle 15 in the same direction. On the other hand, by rotating the arm 45 to mesh the gear 44 with gear 42, the second idler 44 will be interposed in the train and produce a reverse rotation of the spindles. It is to be noted that the diameter of the idlers 43 and 44 is greater than the distance between the peripheries of the gears 41 and 42 and that the slot 49 is made sufficiently longer than the movement necessary to bring the idlers into mesh with the gear 42 so that back lash may also be eliminated between the idlers and the gear 42. All gears are accurately cut and by means of this structure, rotation of the two spindles may be absolutely synchronized.

Indexing of the blank and model may be done either manually or automatically as set forth in the foregoing application Serial No. 550,795. The drive for rotating the spindles 14 and 15 may, however, be described here briefly as consisting of a worm gear 60 keyed to the spindle 14 and meshing with a worm 61 on a cross shaft 62. The shaft 62 is journalled in bearings 63 supported on a bracket 64 which is hinged at one end, as indicated at 65, for movement toward and away from the worm gear 60, and supported at its opposite end by a cam 66 carried on a shaft 67 and adapted to be rotated by a lever 68.

One end of the worm shaft 62 carries a hand wheel 69 while the opposite end has splined thereon a sliding gear 70 which is adapted to mesh with a gear 71 on the slow speed shaft of a speed reducer 72. The high speed shaft of the reducer is coupled to the shaft of a small electric motor 73 mounted on the bracket 64 as shown in Figures 3 and 4. This motor is started at the ends of the feed strokes of the table by a starting switch (not shown) closed by movement of the table and stopped by a limit switch 74, actuated by a notched indexing plate 75 on the spindle 14 when the indexing plate has rotated the distance of one of its notches.

If it is desired to index the work and model manually, the motor drive may be disconnected by sliding the gear 70 out of mesh with the gear 71, by means of a suitable shift rod 70', which leaves the worm 61 free to be rotated by the hand wheel 69. Again, for certain operations, such as machining the twisted flat faces of the blades, as will be described, it is desirable that the spindles 14 and 15 be permitted to rotate independently of either the automatic or manual indexing mechanism and be controlled by the master model. To this end the worm 61 may be disengaged from the worm gear 60 by rocking the cam 66 and permitting the bracket 64 to move about its hinge 65 away from the worm gear.

Preferably a guard 75', attached to the headstock frame, encloses the gearing.

Figures 8, 9:
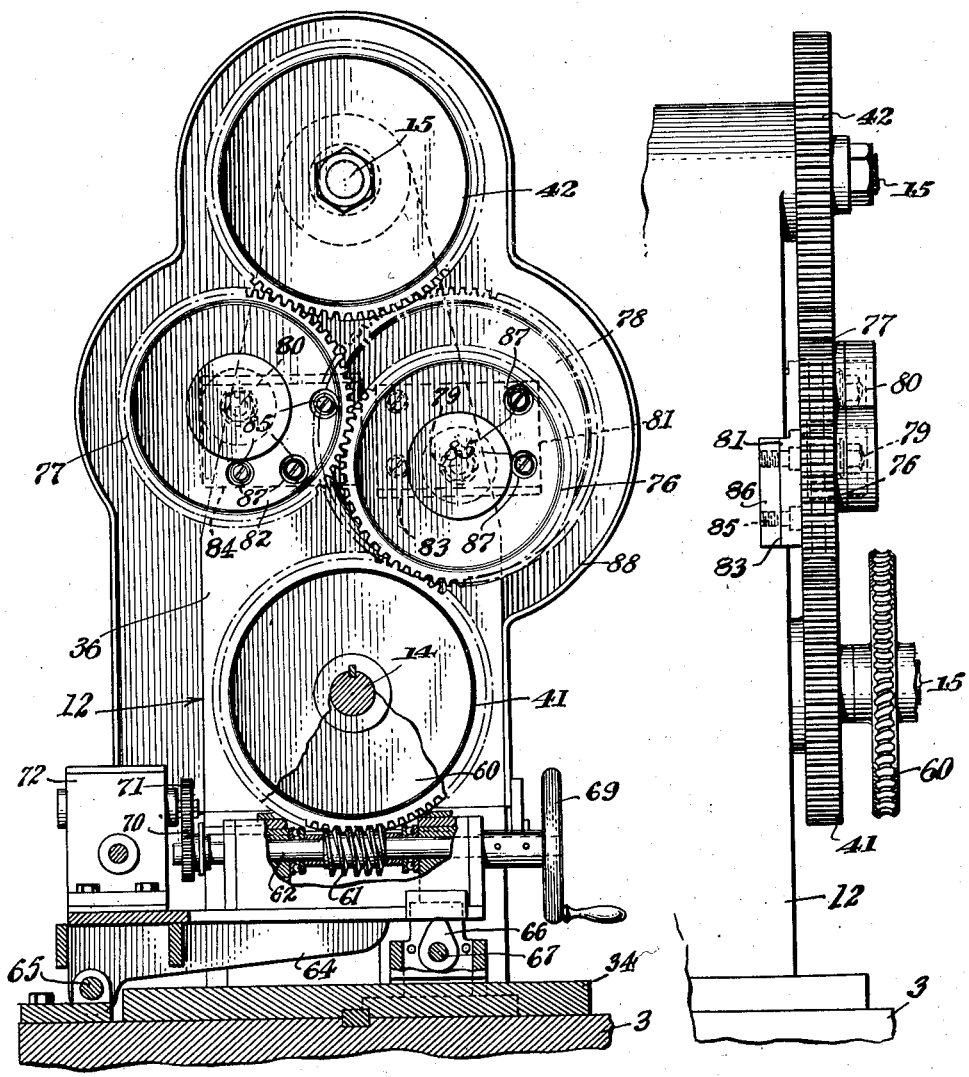
Figure 8 is a view similar to Figure 5 but showing a modified arrangement of reverse gearing.
Figure 9 is a side-elevational view of the gear arrangement illustrated in Figure 8.

A somewhat simpler arrangement of headstock gearing which is suitable where similar blades are produced in quantity is shown in Figures 8 and 9. In this embodiment of the invention a pair of idler gears 76 and 77 are detachably mounted on the rear plate 36 of the headstock frame to mesh respectively with the spindle gears 41 and 42 to give reverse rotation of the spindles 14 and 15 while to effect like rotation of the spindles a single idler 78 replaces the pair and operatively connects the gears 41 and 42 as indicated by dotted lines in Figure 8.

The reversing idlers 76 and 77 are respectively mounted for free rotation on studs 79 and 80 carried by separate slide blocks 81 and 82. These slide blocks are respectively fitted for lateral adjustment toward each other in grooves 83 and 84 formed in the back plate 36 and are secured in adjusted position by cap screws 85 which pass through clear holes in the blocks and are threaded into plates 86 which form the base of the grooves. The clear holes in the blocks may be elongated or drilled somewhat larger in diameter than the screw shanks to permit sufficient movement of the slide blocks in their grooves and eliminate backlash both between the idlers and their mating spindle gears.

Access may be had to the screws 85 for removal and positioning of the idlers, or adjustment, through apertures 87 drilled through the gears to register with the screws.

The single idler gear 78 is mounted on a slide block identical with the block 81 which is positioned in the groove 83 when the single idler is used. This single idler is of sufficient diameter and is located on its slide block so that it will mesh with both of the gears 41 and 42 when in position.

A suitable guard 88, detachably secured to the headstock frame encloses the gears during operation of the machine.

While the machine is not limited to carving wooden propeller blades, as it is obvious that it may be used to profile blades composed of other materials, such as plastic or aluminum, a brief description will be given of the operations employed in the forming of wooden blades for contra-rotating propellers by way of example.

The blanks from which the wooden blades are formed are usually made by bonding together several relatively thin strips of wood having a width somewhat in excess of the finished width of the blade and of different lengths, the longest strips being the center laminations and the shortest at the shank end of the blade so that the blank tapers in steps from the shank to the tip. The tip end of the blank is twisted relative to the shank to give correct twist to the blank which is fixed therein as the bonding material sets. Blanks for right and left hand blades are given opposite twists. The blanks thus formed are laminated pieces, rectangular in plan, slightly longer and wider than the blade to be formed, stepped in longitudinal cross-section from the shank end to the tip on opposite surfaces and having a longitudinal twist.

The next operation is to saw these laminated pieces roughly to the plan form of the blade, after which they are centered in a lathe and the shank turned cylindrical to fit the headstock chuck. The tip end of the blank is also turned down to correct size and tapered to fit a female center in the tailstock.

The master model 19 of the blade is set up in the machine with its shank secured in the upper chuck 17 and the tip held by the tailstock center 21. This master model is machined from metal or other suitable material perferably of somewhat larger width and thickness than the dimensions of the blade in order to provide a piece of sufficient rigidity to take the strains imposed on it. Considering this master model to be a model of a right hand blade and the headstock gearing arranged to give like rotation of the spindles 14 and 15 by interposing a single idler between the gears 41 and 42, a right hand blank is positioned between the lower chuck 16 and the lower tailstock center 20. The master model and blank are adjusted to the same relative angular positions in their respective chucks such as shown in Figure 2 and the chucks fixed to immovably clamp the blank and model in these positions.

The follower rolls 30 are adjusted with respect to the cutters 27 by means of their slides to give the desired depth of cut and the machine is put in operation to reciprocate the table on its ways relative to the cutter heads. As the cutter heads are urged inwardly toward the blank and model, the inward movement is limited by engagement of the follower rolls 30 with the master model 19. Thus, as the table moves the blank and model, the feed of the cutter carriages is varied in accordance with the contour of the model and a cut is made on the blank by the cutter 30 in accordance with the shape of the model. At the end of the feed stroke, the blank and model are both simultaneously rotated about their axes by means of the indexing mechanism above set forth and on the return stroke a second cut will be made on the blank also in accordance with the corresponding increment of the model.

The above cyclic operation is repeated until the blank has been rotated through a full 180°, that is, when a cut has been made completely around the blank by the opposed cutters. This first cut will principally remove the angular corners from the blank. The follower rolls are then backed off with respect to the cutters and the above operations are repeated through another full 180° of rotation of the work. These operations, which may be considered roughing cuts, are continued until the blank has assumed the shape of the blade but slightly oversize. The roughing cuts are usually made by indexing about 10° or 15° for each feed stroke of the work which forms the blade roughly to shape but leaves a series of flats extending the length of the blade.

To make the finishing cuts on the blade, the indexing plate 75 used for roughing is replaced by one which will rotate the index spindles through smaller increments, for example, one or two degrees. The follower rolls are adjusted to give a light cut and the machine put in operation and the finishing cuts are made completely around the blade in the manner above described. These finishing cuts reduce the flats formed by the roughing cuts in width so that a substantially finished curve is produced on the blade.

The shank end of the blade, which is cylindrical, is gradually merged into the curvature of the leading and trailing edges and the camber of the upper surface and the flat rear surface of the blade. The twist of the master model is also reproduced in the work. The indexing cuts, however, will not leave the rear face of the blade perfectly flat and to machine this twisted flat face, an additional cut is necessary.

After roughing and finishing cuts have been made and without changing the follower roll adjustment, the indexing drive is disconnected in the manner above set forth by moving the cam 66 to allow the worm 61 to become disengaged from the worm gear 60, which leaves the spindles 14 and 15 freely rotatable but geared together through the intermediate idler gear 43. The cutter adjacent the cambered face of the blade is then moved away from the face of the work by moving its carriage outwardly and latching it in this retracted position. When the work is then fed with respect to the opposite or engaged cutter, the blade and model will be rotated in accordance with the twist of the model by the pressure of the follower roll on the flat face thereof and the engaged cutter will produce a correspondingly flat face on the work. When this operation has been performed the finished blade may then be removed and replaced with another blank. The only other operations necessary to complete the blade is removal of the plug at the tip, finishing off the tip, and lightly sanding the blade preparatory to lacquering.

The above described operations, however, produce blades for rotation corresponding to that of the master model which is in this case right hand. To produce a blade for left hand rotation from the same, that is, right hand model, in accordance with this invention, the relative direction of rotation of the spindles 14 and 15 is reversed by interposing both idler gears between the spindle gears 41 and 42.

In the case of the first described embodiment of the invention, this is brought about by loosening the nut 52 and rocking the idler gear supporting arm 45 about its pivot to engage the gear 44 with the gear 42 and then locking the gear in this position by tightening the nut 52. In the case of the second embodiment, the single idler gear 78 is replaced by the pair of idler gears 76 and 77. One of the left hand blanks is set up between the chuck 16 and the tailstock center 20 in the position with respect to the master model shown in the diagrammatic view in Figure 10, that is, for instance, with the flat side of the blank facing the flat side of the model. The cutting operations are then performed in the exact manner described with reference to the right hand blade. The blank, however, will be indexed about its axis in a direction opposite from that of the master model. In other words, if the model is rotated counter-clockwise the blank will be rotated in a clockwise direction as indicated by the arrows in Figure 10. Thus, although the model and the blank are opposite, corresponding increments of the model and blank will be respectively engaged by the follower rolls and cutter as the model and blank are rotated. As a result, at the end of the operation, considering the blank has been machined down to the same size as the aforementioned right hand blank, the left-hand blade will have a size and contour similar to the right hand blade but for opposite rotation.

By means of the foregoing, it will be seen that by the provision of the gearing arrangement constituting this invention, both right and left hand blades may be produced from a single master model, with the results that one blade absolutely corresponds in shape and size to another blade.

While there has been shown and described a preferred apparatus and preferred procedural and operational steps, the apparatus and the steps of manufacturing propeller blades disclosed are for the purpose of illustrating the principles involved in the inventive concept and many changes may be made, by those skilled in the art, in the order of the steps and the design and arrangement of the several parts, without departing from the spirit of the invention or from the scope of the appended claims.

I claim:

1. In an indexing mechanism for a machine tool of the character described for carving either right or left hand propeller blades in accordance with a master model of a single blade, said mechanism having a work carrying spindle rotatable to index the work and a model carrying spindle rotatable to index the model, the improvement comprising a gear on each spindle, and selectable idler gearing for coupling said spindle gears, said idler gearing including a single idler gear adapted to be meshed with both spindle gears for indexing the blank and model in the same direction to carve blades similar to the model, and a pair of meshed idler gears adapted to be meshed respectively with the spindle gears for indexing the blank and model in opposite directions to carve blades opposed to the model a common support for said idler gears, and movable journalling means for at least one idler gear carried by the support for adjusting the said idler gear relative to other of said gears to reduce back lash therebetween.

2. In an indexing mechanism for a machine tool of the character described for carving either right or left hand propeller blades in accordance with a master model of a single blade, said mechanism having a work carrying spindle rotatable to index the work and a model carrying spindle rotatable to index the model, the improvement comprising mechanism for transmitting rotation from one spindle to the other spindle and including a gear on each spindle, a first idler gear in constant mesh with one of said spindle gears, a second idler gear in constant mesh with the first idler gear, and means for selectively meshing the first idler gear with the other spindle gear to index the work and model in the same direction to carve blades similar to the model, and for meshing the second idler gear with said other spindle gear for indexing the work and model in opposite directions to carve blades opposed to the model said means including a common support for said idler gears, and movable journalling means for at least one idler gear carried by the support for adjusting the said idler gear relative to other of said gears to reduce back lash therebetween.

3. In an indexing mechanism for a machine tool of the character described for carving either right or left hand propeller blades in accordance with a master model of a single blade, said mechanism having a work carrying spindle rotatable to index the work and a model carrying spindle rotatable to index the model, and a common support for the spindles, the improvement comprising a gear on each spindle, an arm mounted on said support for movement about the axis of one of said spindles, a first idler gear mounted on said arm and in constant mesh with the gear on the spindle about which the arm moves, a second idler gear on the arm and in constant mesh with the first idler gear, and means for moving the arm to one position to mesh the first idler gear with the other spindle gear for indexing the work and model in the same direction to carve blades similar to the model and to a second position to mesh the second idler gear with said other spindle gear for indexing the work and model in opposite directions to carve blades opposed to the model moveable journalling means for at least one idler gear carried by said arm for adjusting the said idler gear relative to other of said gears to reduce the back lash therebetween.

4. In an indexing mechanism for a machine tool of the character described for carving either right or left hand propeller blades in accordance with a master model of a single blade, said mechanism having a work carrying spindle rotatable to index the work and a model carrying spindle rotatable to index the model, and a common support for the spindles, the improvement comprising a gear on each spindle, an arm mounted on said support for movement about the axis of one of said spindles, a first idler gear mounted on said arm and in constant mesh with the gear on the spindle about which the arm moves, a second idler gear on the arm and in constant mesh with the first idler gear, means for moving the arm to one position to mesh the first idler gear with the other spindle gear for indexing the work and model in the same direction to carve blades similar to the model and to a second position to mesh the second idler gear with said other spindle gear for indexing the work and model in opposite directions to carve blades opposed to the model, and means for securing said arm in either of the said positions movable journalling means for at least one idler gear carried by said arm for adjusting the said idler gear relative to other of said gears to reduce the back lash therebetween.

5. In an indexing mechanism for a machine tool of the character described for carving either right or left hand propeller blades in accordance with a master model of a single blade, said mechanism having a work carrying spindle rotatable to index the work and a model carrying spindle rotatable to index the model, the improvement comprising a gear on each spindle, and a pair of interchangeable idler systems for operatively connecting the spindle gears, one of said idler systems comprising a single gear adapted to connect said spindle gears to index the work and model in the same direction for carving blades similar to the model and the other idler system comprising a pair of meshed gears adapted to connect said spindle gears to index the work and model in opposite directions to carve blades opposed to the model a common support for said idler gears, and movable journalling means for at least one idler gear carried by the support for adjusting the said idler gear relative to other of said gears to reduce back lash therebetween.

6. In an indexing mechanism for a machine tool of the character described for carving either right or left hand propeller blades in accordance with a master model of a single blade, said mechanism having a work carrying spindle rotatable to index the work and a model carrying spindle rotatable to index the model, and a common support for the spindles, the improvement comprising a gear on each spindle, a pair of interchangeable idler systems for operatively connecting the spindle gears, one of said idler systems comprising a single gear adapted to connect said spindle gears to index the work and model in the same direction for carving blades similar to the model and the other idler system comprising a pair of meshed gears adapted to connect said spindle gears to index the work and model in opposite directions to carve blades opposed to the model, and independent detachable means for journalling each of the idler gears to the support each of said means including a support for the gear, and means for adjustably positioning each of the gear supports relative to the spindle gears to reduce back lash in the gearing.

GEORGE F. LANDGRAF.

REFERENCES CITED

The following references are of record in the file of this patent:

UNITED STATES PATENTS

| Number | Name | Date |
| --- | --- | --- |
| 806,075 | Fawcus | Nov. 28, 1905 |
| 1,893,957 | Parten | Jan. 10, 1933 |
| 1,798,926 | Black | Mar. 31, 1931 |
| 842,697 | Phillips | Jan. 29, 1907 |
| 1,660,048 | Reed | Feb. 21, 1928 |

FOREIGN PATENTS

| Number | Country | Date |
| --- | --- | --- |
| 506,927 | France | Sept. 1, 1920 |